United States Patent [19]

Keyes

[11] 4,088,117
[45] May 9, 1978

[54] SOLAR HEAT COLLECTING UNITS
[75] Inventor: John H. Keyes, Nederland, Colo.
[73] Assignee: International Solarthermics Corporation, Nederland, Colo.
[21] Appl. No.: 699,528
[22] Filed: Jun. 24, 1976
[51] Int. Cl.² .............................................. F24J 3/02
[52] U.S. Cl. .................................. 126/270; 237/1 A; 165/182
[58] Field of Search ............... 237/1 A; 126/270, 271; 165/182

[56] References Cited
U.S. PATENT DOCUMENTS

| | | | |
|---|---|---|---|
| 721,258 | 2/1903 | Wadsworth | 350/259 |
| 2,680,437 | 6/1954 | Miller | 126/270 |
| 2,969,788 | 1/1961 | Newton | 126/271 |
| 3,089,016 | 5/1963 | Kelly | 165/182 |
| 3,089,670 | 5/1963 | Johnson | 126/270 |
| 3,270,739 | 9/1966 | Thomason | 126/271 |
| 3,285,333 | 11/1966 | Johnson, Jr. | 126/270 |
| 3,841,302 | 10/1974 | Falbel | 126/270 |
| 3,867,981 | 2/1975 | Monroe | 165/182 |
| 3,981,445 | 9/1976 | Custer | 237/1 A |
| 3,982,527 | 9/1976 | Cheng et al. | 126/270 |
| 4,026,273 | 5/1977 | Parker | 126/271 |

Primary Examiner—John J. Camby
Assistant Examiner—Henry C. Yuen
Attorney, Agent, or Firm—Gary M. Polumbus

[57] ABSTRACT

A solar heat collecting plate as part of an assemblage of the plates is adapted to be used in a solar heat collector for solar furnaces and the like and is designed so that the solar collector can be oriented at any angle relative to the angle of the sun. Several embodiments of the heat collecting plate are disclosed but principally each includes an inner plate portion adapted to protrude generally perpendicularly away from a back support wall of the solar collector and an outer plate portion forming an obtuse angle from the outer edge of the inner plate portion. One surface of the outer plate portion is reflective to solar radiation while the other surface of the outer plate portion and both surfaces of the inner plate portion and the back wall of the solar collector are absorptive of solar radiation. When the collecting plates are assembled on the back support wall of the solar collector in spaced parallel relationship, solar radiation is trapped either within or between adjacent collecting plates virtually eliminating radiative losses from the solar collector. In one embodiment, the outer plate portion is pivotally connected to the inner plate portion to selectively optimize the capture of the solar radiation dependent upon the angle of the sun.

17 Claims, 4 Drawing Figures

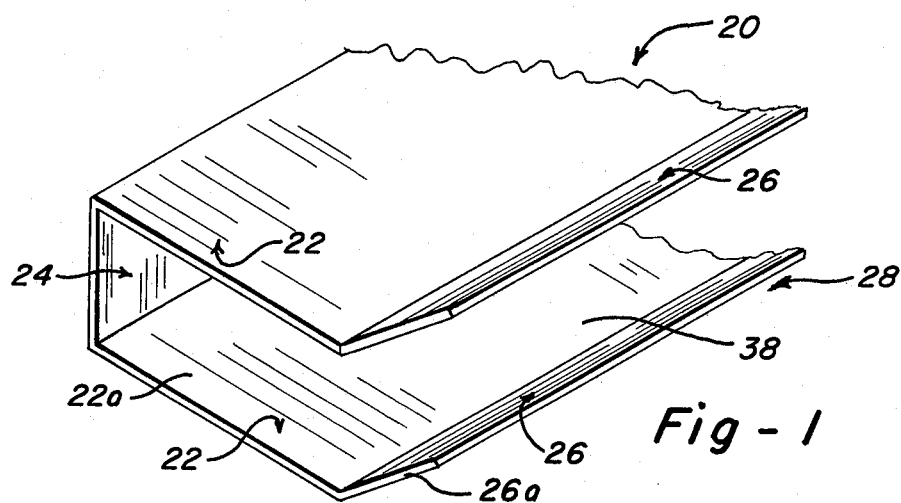
Fig - 1
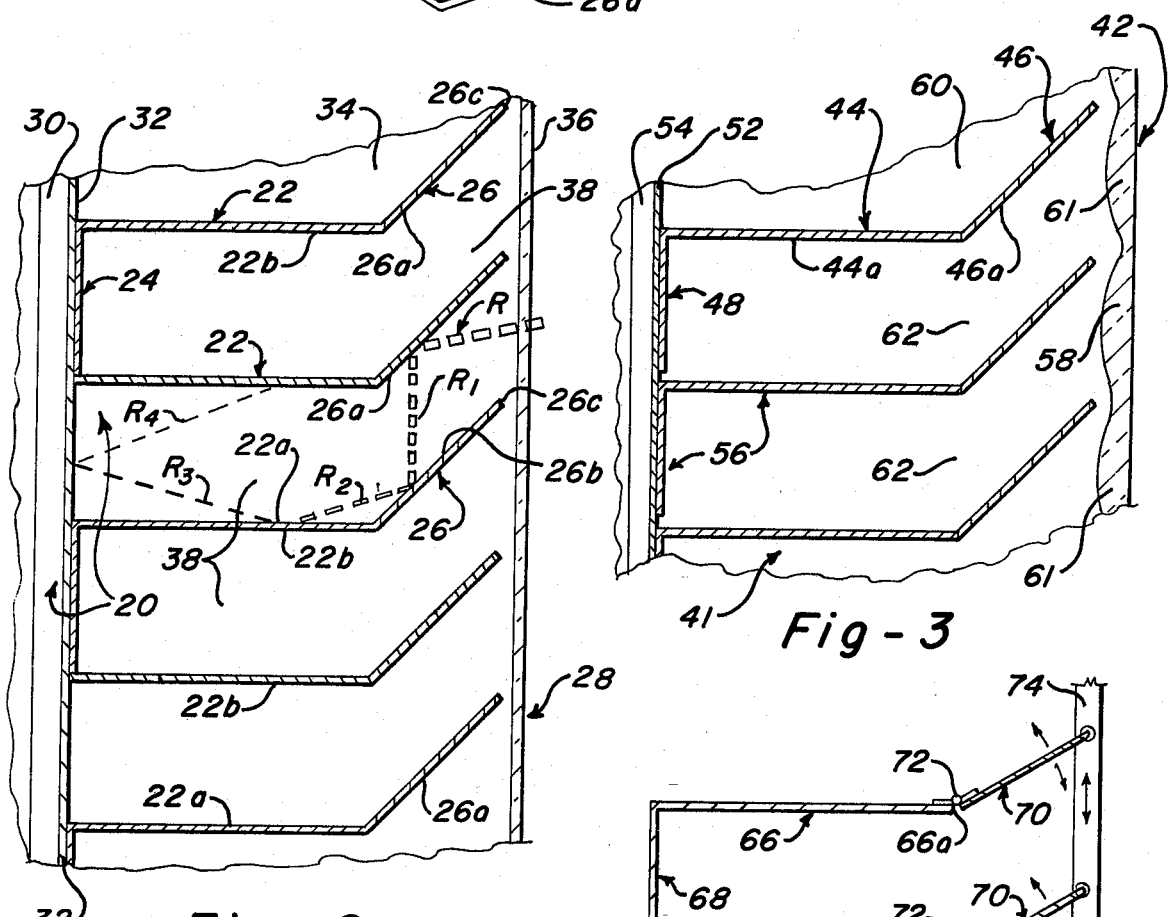
Fig - 2
Fig - 3
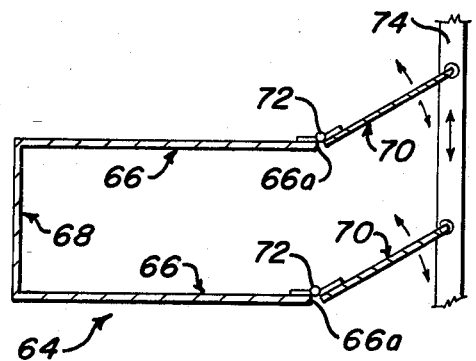
Fig - 4

SOLAR HEAT COLLECTING UNITS

BACKGROUND OF THE INVENTION

1. Field of the Invention

The present invention relates generally to solar heat collection and more particularly relates to a heat collecting plate as well as an assemblage of the collecting plates adapted to be used in a solar collector to trap and absorb solar radiation.

2. Description of the Prior Art

The tremendous energy output of the sun has been recognized for years and numerous attempts have been made at harnessing this energy so that it can be converted into a useful state. For example, the sun's energy has been successfully converted into electrical energy with solar batteries and similarly, the sun's energy has been converted into heating systems by so-called solar stoves, furnaces and the like. The solar furnace apparatuses, however, have been typified by extremely large collectors covering large portions of the roof structure of a building to be heated with the apparatus and it has been necessary that these collectors be oriented at a particular angle relative to horizontal (usually between 45° and 60°) to be generally in a perpendicular relationship with the solar radiation received at the location of the collector.

With the exception of the solar furnace apparatus disclosed in, U.S. Pat. Nos. 3,987,786, 3,946,721, 3,946,720, 3,946,944 and 3,894,685, the prior art solar furnace systems have required unusually large collectors to capture enough solar radiation to adequately heat a building structure even on a temporary basis. The combination of the extremely large size of the collector with the fact that the collectors had to be mounted at the preselected angle relative to horizontal to adequately collect solar radiation posed numerous practical problems. The most logical place to install a large collector was in the roof of the building structure but due to the necessary angle required of the collector, the angle of the roof normally adversely affected the aesthetic appearance of the building structure. Accordingly, it has long been recognized that a solar collector which could be oriented at any angle relative to horizontal, even purely horizontal or vertical, would resolve many structural as well as aesthetic problems which have plagued those trying to utilize solar radiation on a practical and efficient basis for energy purposes.

OBJECTS OF THE INVENTION

The present invention has for its primary object the provision of a new and improved solar heat collecting plate which will enable solar collectors to be oriented at any angle relative to horizontal and improve the solar heat collecting ability of the solar collector.

It is another object of the present invention to provide a new and improved solar heat collecting plate which can be used in a solar collector to not only optimize the collection and absorption of solar radiation but also minimize the construction costs of the solar collector.

It is another object of the present invention to provide a solar heat collecting plate which is adapted to trap solar radiation and minimize radiative losses which have previously inhibited the efficiency of solar collectors.

It is still another object of the present invention to provide a new and improved solar heat collecting plate which is adapted to cooperate with other identical plates in trapping and absorbing solar radiation in a solar collector wherefrom it can be readily transferred to a storage location in an efficient manner.

It is still a further object of the present invention to provide a solar heat collecting plate adapted for use in a solar collector to not only efficiently collect direct solar radiation but also collect indirect or diffuse radiation whereby the solar collector can be oriented in any direction as well as at any angle relative to horizontal and still collect useful solar radiation.

SUMMARY OF THE INVENTION

The foregoing and other objects of the present invention are obtained with a solar heat collecting plate or unit which is adapted to be mounted upon a support surface in a solar collector so that an inner plate portion of the plate extends away from the support surface and has an outer plate portion forming an obtuse angle with the outer edge of the inner plate portion. As will be more fully appreciated with the more detailed description later, a plurality of the collection plates mounted in spaced relationship cooperate in efficiently trapping and absorbing solar radiation so as to minimize radiative losses.

One surface of the outer plate portion of each collecting unit is reflective to solar radiation while the other surface of the outer plate portion and both surfaces of the inner plate portion as well as the support surface are absorptive of solar radiation so that radiation is reflected into an area defined by absorptive surfaces which cooperate with each other in absorbing direct radiation as well as reflected radiation. Since even black surfaces reflect a certain percent of the visible light spectrum, it is important that the collecting plates define a trap-like arrangement so that even the radiation reflected by the black surfaces will be reflected toward another black surface whereby the radiation will be substantially completely absorbed.

Since substantially all of the solar radiation received by a solar collector incorporating the collecting plates of the present invention is absorbed by the collecting plates, the double and triple pane glass previously found necessary in prior art solar collectors to prevent the solar radiation from escaping the solar collector is no longer needed. Rather, a single pane of glass can be used.

Due to the angular relationship of the outer plate portion of the collecting plate to the inner plate portion, the solar collector in which the plates are mounted can be oriented at any angle relative to horizontal and still efficiently collect solar radiation. In other words, by properly selecting the angle which the outer portion makes with the inner portion, it is possible to orient the flat front glass pane of the solar collector at any angle relative to horizontal. This makes it possible for the solar collector to be built into a vertical wall, placed on a flat roof or in any other portion of a building structure to minimize the adverse affects of the solar collector on the aesthetics of the building structure.

Another advantage of the use of the collecting plates of the present invention in a solar collector is that the collector can be made much smaller than a typical solar collector because of the higher efficiency in absorbing solar radiation. Also, because of the angular relationship of the outer plate portions with the general angular orientation of the solar collector, the collecting plates are effective in absorbing diffuse solar radiation so that the collector can be oriented to face in a direction other than south and still absorb solar radiation.

BRIEF DESCRIPTION OF THE DRAWINGS

FIG. 1 is a fragmentary perspective view of a solar heat collecting plate of the present invention, FIG. 2 is a fragmentary vertical section taken through a solar collector with a plurality of the collecting plates of FIG. 1 mounted therein, FIG. 3 is a fragmentary vertical section taken through a solar collector utilizing a second embodiment of the collecting plate of the present invention, and FIG. 4 is an end elevation of still another embodiment of the collecting plate of the present invention.

DESCRIPTION OF THE PREFERRED EMBODIMENTS

Referring first to FIG. 1, a collecting plate or unit 20 is shown to include a pair of parallel inner plate portions 22 connected along a common edge by a back plate 24 which is perpendicularly related to each of the inner plate portions. An outer plate portion 26 extends away from the outer edge of each inner plate portion 22. Each outer plate portion forms an obtuse angle with the inner plate portion and is in parallel relationship with the other outer plate portion of the collecting plate 20. The collecting plate 20 may be made from one sheet of material with the material bent to define the separate plate portions 22, 24 and 26. The plate portions could also be suitably connected as by welding, to define the collecting plate 20 as it is illustrated in FIG. 1. Each plate portion 22, 24 and 26 is rectangular in configuration and could be made of any length, but preferably is of a length to completely traverse the width of the solar collector 28 into which the collecting plate is to be positioned. The spacing between the pairs of inner plate portions 22 and outer plate portions 26 is preferably in the range of two to four inches, and the collectors are made of a heat absorptive material such as aluminum.

The aluminum or other material from which the collecting plate 20 is made is preferably black or at least coated with a black material with the exception of the lower surface 26a of the outer plate portions 26 as viewed in FIG. 1, which surface is either reflective or coated with a reflective material which will reflect solar radiation. The purpose for the reflective surface and the black surfaces will become more apparent after a description of the manner in which the collecting units are mounted in the collector.

Referring to FIG. 2 wherein a vertical section through a solar collector 28 utilizing the collecting units 20 of FIG. 1 is shown, it will be appreciated that the solar collector has a back or support panel 30 with a front surface thereof having a covering 32 of a black material which is absorptive of solar radiation. The collecting plates 20 are mounted upon the front surface of the back panel 30 so that each plate is equally spaced from an adjacent plate and at a spacing substantially the same as the spacing between the inner plate portions 22 of each collecting plate 20. The back plate portion 24 of each collecting plate is mounted in contiguous, parallel relationship with the front surface of the support panel 30 and is secured in position by fasteners such as screws or the like (not shown).

The solar collector 28 has side wall members 34, only one being seen extending forwardly from the peripheral edges of the support panel 30 and defining at their leading edge means (not shown) for retaining in hermetic sealed relationship a transparent glass pane or panel 36. The glass panel is spaced from the support panel so as to lie in closely spaced relationship with the outer free edge 26c of the outer plate portions 26. It will, therefore, be appreciated that each collecting plate singly and in combination with adjacent collecting plates defines a channel 38 therewithin or therebetween, respectively, which extend transversely of the solar collector. Air or another heat transfer medium, such as water or the like, can be passed transversely through the channels 38 to withdraw heat from the collector 28 and transfer the heat to a storage area (not shown) in a manner similarly to that described in the aforementioned application Ser. No. 445,473. While the solar collector illustrated in FIG. 2 is shown in a vertical orientation it is understood that this is only for descriptive purposes and that the collector could be oriented in any relationship relative to horizontal and still efficiently collect, trap and absorb solar radiation dependent upon the angular relationship of the outer plate portions to the angle of the sun.

Referring to the dotted line representation in FIG. 2 of a single solar ray R, it can be appreciated how the solar radiation is trapped and absorbed in and between the collecting plates 22 and 26. With the solar ray illustrated, it will be appreciated that the ray enters the solar collector through the glass panel 36 in the form of long wave radiation R1 and impinges upon the lower surface 26a of one of the outer plate portions 26. This surface forms a selected angle between 180° and 270° with the lower surface 22b of the inner plate portion 22 to which it is connected. The ray R of solar radiation is reflected from the lower surface 26a of the outer plate portion downwardly to the upper surface 26b of the next adjacent outer plate portion which forms an obtuse angle with the upper surface of its associated inner plate portion. As mentioned before, the upper surface 26b of the outer plate portion is black so as to absorb the radiation but, as is known in the art, even black surfaces reflect a certain percent of the visible light spectrum. The reflected ray R2 from the upper surface of the outer plate portion is directed toward the upper surface 22a of the associated inner plate portion 22 where more of the visible light spectrum is absorbed but again, a small portion of the ray received by the upper surface 22a of the inner plate portion 22 is reflected as R3 to the back plate portion 30 of the collecting plate, or in the illustrated instance of the black covering 32 on the support panel 30. The black covering on the support panel absorbs some of the solar radiation from the ray R3 it receives and reflects the remainder as R4 to the lower surface 22b of the adjacent overlying inner plate portion. By the time the solar radiation reaches the lower surface 22b of the next adjacent overlying inner plate portion 22 substantially all the energy in the ray has been absorbed and trapped within the collector plate 20.

Accordingly, by utilizing a plurality of the collecting plates 20 shown in FIG. 1 within a solar collector 28, an optimum amount of solar radiation can be trapped where it can be transferred in a known manner with a transfer medium, such as air, to a storage area by passing the transfer medium through the channels 38 defined in and between the collecting plates.

Referring to FIG. 3, a second embodiment of the collecting plate of the present invention is shown mounted within a solar collector 41. The collecting plate 42, illustrated in FIG. 3, consists of an inner plate portion 44 to which an outer plate portion 46 extends at an obtuse angle from one edge, and a back plate portion 48 protruding from an opposite edge of the inner plate portion at a perpendicular angle thereto. As in the first described embodiment, the collecting plate 42 is made of a black material or coated with a black material with the exception of the lower surface 46a of the outer plate portion 46 which forms an angle of between 180° and 270° with the lower surface 44a of the associated inner plate portion 44. The collecting plate 42 is mounted within the collector 41 by affixing in any suitable manner the back plate portion 48 to a black covering 52 on a back or support panel 54 of the solar collector. A plurality of the collecting plates 42 are mounted in overlying relationship, as illustrated in FIG. 3, so that they are equally spaced with the associated plate portions 44 and 46 being in parallel relationship. In the solar collector 41 illustrated in FIG. 3, instead of utilizng a glass panel at the front of the solar collector, a lens panel 58 is supported by sidewalls 60 of the collector, only one being seen so as to lie immediately adjacent to the outer edge of the outer plate portions 46. The lens panel 58 has a plurality of elongated transversely extending lenses 61 formed therein which are aligned with the space between the outer edges of adjacent outer plate portions. The lenses 61 are convex inwardly to focus solar radiation whereby it is desirably trapped by the collecting plates 42 and absorbed thereby in optimum fashion. As will be appreciated, the adjacent collecting plates define spaces 62 therebetween which are similar to the channels 38 in and between the collecting plates 20 illustrated in FIG. 2, so that the solar radiation is trapped in the same manner as described in connection with FIG. 2.

FIG. 4 illustrates still another embodiment of the present invention wherein the collecting plate 64 has a pair of inner plate portions 66 interconnected along one edge by a back plate portion 68 so that it can be mounted in a solar collector (not shown) similarly to the plate 20 shown in FIG. 1. A pair of outer plate portions 70 are connected to the outer edge 66a of the inner plate portions 66 by a conventional hinge 72, such as of the piano hinge-type, so that the outer plate portions 70 are freely pivotal about the outer edge 66a of the inner plate portions. To assist in uniform pivotal movement of the outer plate portions, as interconnecting rod 74 can be pivotally connected to the outer edges of the outer plate portions whereby upon vertical movement of the interconnecting rod the outer plate portions 70 are caused to pivot about their connection to the inner plate portions 66. The relative angle between the inner and outer plate portions is selected according to the angle of the sun, which changes with the seasons, and the spacial orientation and direction in which the solar collector is oriented. In other words, a solar collector which is not receiving direct solar radiation might have the outer plate portions 70 adjusted so as to optimally receive difuse radiation while the outer plate portions directly receiving solar radiation would be oriented so that the radiation is optimally trapped and absorbed by the collecting plates 64.

It will be readily apparant to those skilled in the art that the embodiment of the invention shown in FIG. 3 could have the outer plate portion 46 pivotally connected to the inner plate portion 44 in a manner similar to that illustrated in FIG. 4 for obtaining the same results obtained by the collecting unit shown in FIG. 4.

Although the present invention has been described with a certain degree of particularity, it is understood that the present disclosure has been made by way of example and that changes in details of structure may be made without departing from the spirit thereof.

What is claimed is:

1. A solar heat collecting plate for absorbing solar energy in a solar collector comprising:
   a first relatively planar plate portion having a first surface and an oppositely positioned second surface, and first and second surfaces of said first plate portion being absorptive of solar radiation;
   a second relatively planar portion having a first surface and an oppositely positioned second surface, the first surface of said second plate portion being absorptive of solar radiation, the second surface of said second plate portion being reflective of solar radiation, said second plate portion forming an obtuse angular extension from said first plate portion, the first surface of said second plate portion forming an obtuse angle with respect to the first surface of said first plate portion, and the second surface of the second plate portion forming an angle between 180° and 270° with respect to the second surface of said first plate portion; and
   mounting means operatively associated with said first and second plate portions for positioning the first and second surfaces of said first plate portion and the first surface of said second plate portion to absorb solar radiation.

2. The solar heat collecting plate of claim 1 further including a third plate portion operably connected to said first plate portion in parallel and spaced-apart relation with respect to said first plate portion, and a fourth plate portion forming an extension from an edge of said third plate portion in parallel relation with said second plate portion.

3. The solar heat collecting plate of claim 2 wherein said third plate portion includes a first surface and an oppositely positioned second surface, said fourth plate portion includes a first surface and an oppositely positioned second surface, the first surface of said fourth plate portion forms an obtuse angle with the first surface of the third plate portion, and the second surface of the fourth plate portion forms an angle between 180° and 270° with the second surface of said third plate portion.

4. The solar heat collecting plate of claim 3 wherein the first and second surfaces of said third plate portion and the first surface of said fourth plate portion are absorptive of solar radiation, and the second surface of the fourth plate portion is reflective to solar radiation.

5. The solar heat collecting plate of claim 1 wherein said mounting means is connected to said first plate portion to facilitate connecting said first plate portion to a support surface.

6. The solar heat collecting plate of claim 5 wherein said mounting means is flat and forms a generally perpendicular extension from an edge of said first plate portion opposite the edge thereof from which said second plate portion extends.

7. The solar heat collecting plate of claim 6 wherein said mounting means is absorptive of solar radiation.

8. The solar heat collecting plate of claim 1 wherein said second plate portion is pivotally connected to the edge of the first plate portion.

9. An assemblage of solar energy collecting and absorbing plates mounted upon a generally planar support surface, each collecting and absorbing plate having a first plate portion extending generally perpendicularly away from said support surface in spaced apart and parallel relationship with the first plate portion of an adjacent collecting plate to define a channel therebetween, and each collecting and absorbing plate also having a second plate portion associated with the first plate portion and forming an obtuse extension from an edge of said first plate portion, each said second plate portion extending in spaced parallel relationship with the second plate portion of an adjacent collecting and absorbing plate, each of said first and second plate portions having a first surface and a second surface positioned oppositely of the first surface, the first surface of each second plate portion forms an obtuse angle with respect to the first surface of its associated first plate portion, the second surface of each second plate portion forms an angle between 180° and 270° with respect to the second surface of its associated first plate portion and the second surface of at least a few of said second plate portions are reflective to solar radiation.

10. The assemblage of claim 9 wherein the first and second surfaces of each of said first plate portions and the first surface of each of said second plate portions are absorptive of solar radiation.

11. The assemblage of claim 10 wherein said support surface is absorptive of solar radiation.

12. The assemblage of claim 10 further including hinge means pivotably connecting each of said second plate portions to its associated first plate portion.

13. The assemblage of claim 12 further including means operatively interconnecting the second plate portions for unitary pivotal movement relative to the first plate portions.

14. Apparatus for effectively collecting solar energy incident at a variety of angles and for effectively absorbing the energy collected, comprising:
a pair of solar energy collecting and absorbing plate members, each plate member including a first relatively planar portion and second relatively planar portion, each second portion extending from each first portion at a predetermined obtuse angle;
a support surface having a generally planar portion;
means for mounting the first portions of said plate members to the planar portion of said support surface and for mounting the pair of plate members in essentially parallel and spaced apart relationship;
said mounting means positioning the first portions of both plate members to form generally perpendicular extension from the planar portion of said support surface, said mounting means being absorptive of solar energy;
means associated with the second portion of one plate member for reflecting solar radiant energy toward the other plate member and into the space define by said pair of spaced apart plate members and support surface; and
means, associated with the first portions of both plate members and with the planar portion of the support surface, for absorbing the solar radiant energy reflected by said reflecting means.

15. Apparatus as recited in claim 14 wherein said reflecting means is positioned on a portion of the second plate member generally facing away from the planar portion of said support surface.

16. Apparatus as recited in claim 15 wherein said reflecting means comprises a generally planar reflecting surface and said reflecting surface is positioned at angle of between 180° and 270° with respect to the first plate portion.

17. A solar heat collecting plate for absorbing solar energy in a solar collector comprising:
a first relatively planar plate portion,
a second relatively planar plate portion, said second plate portion forming an obtuse angular extension from said first plate portion,
one surface of said second plate portion forming an obtuse angle with one surface of the first plate portion, the opposite surface of the second plate portion forming an angle between 180° and 270° with the opposite surface of said first plate portion,
the opposite surface of the second plate portion being reflective to solar radiation,
both surfaces of said first plate portion and the one surface of the second plate portion being absorptive of solar radiation, and
mounting means connected to said first plate portion to facilitate connecting said collecting plate to a support surface, said mounting means being flat and forming a generally perpendicular extension from an edge of said first plate portion opposite the edge from which said second plate portion extends, and said mounting means being absorptive of solar radiation.

* * * * *